Patented Feb. 5, 1935

1,989,764

UNITED STATES PATENT OFFICE 1,989,764

PROCESS AND COMPOSITION FOR THE PRODUCTION OF REFLECTING SURFACES

Max Meltsner, New York, N. Y.

No Drawing. Application January 3, 1934,
Serial No. 705,087

11 Claims. (Cl. 91—68.3)

The invention relates to a method for the formation of a reflecting surface. More particularly, it pertains to a procedure for the preparation of a silvered reflecting surface and includes correlated improvements and discoveries whereby the formation of such surfaces is enhanced.

The production of reflecting surfaces, particularly silvering for mirrors, has previously been effected by utilization of a composition containing a silver salt in conjunction with compounds capable of releasing the silver therefrom. The compositions most frequently used consisted of silver nitrate, a tartrate, ammonium hydroxide and/or potassium hydroxide. While under certain controlled conditions such compositions produced a satisfactory reflecting surface, nevertheless failures were not infrequent and other disadvantages attended. Thus potassium hydroxide, being of a highly caustic nature, was difficult not only to store, but also to handle throughout the preparation of the silvering composition and its subsequent use.

It is an object of the invention to provide a method for the formation of reflecting surfaces in accordance with which the disadvantages attending the procedures hitherto followed have in a large measure been obviated.

Another object of the invention is to provide a method for the formation of a silvered reflecting surface in which a silver salt is reacted with an amino alcohol.

A further object of the invention is to provide a method for forming silvered reflecting surfaces which may be readily, efficiently and economically carried out on a commercial scale.

An additional object of the invention is to provide a composition suitable for the formation of silvered reflecting surfaces and containing a silver salt and an amino alcohol, in reactive proportions.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention the formation of a reflecting surface, for example, a silvered mirror, may be effected by reacting a composition containing a silver salt and an amino alcohol having the amino and hydroxyl groups joined to different carbon atoms in contact with the object upon which the reflecting surface is to be produced. The reaction may be brought about by admixing a silver salt and an amino alcohol in reactive proportions, placing the admixture thus formed upon the object to be silvered, and causing deposition of silver by increase in temperature. The silver salts which may be used are those which are soluble to a fair degree in water or are so rendered when they are in a medium in the presence of an amino alcohol. Various silver salts may be used, mention being made more specifically of the nitrate sulfate, acetate, chlorate, cyanide, fluoride and silver potassium cyanide. The amino alcohols employed are compounds which are derivatives of ammonia in which one or more of the hydrogen atoms have been substituted by an alcoholic radical, thus, for example, the beta-ethanolamines, as triethanolamine having the probable formula

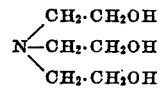

In addition to triethanolamine other amino alcohols may be employed as diethanolamine, monoethanolamine, and mixtures of the ethanolamines in varying proportions. Other amino alcohols that may be mentioned are the propanols and butanols. However, because of the availability and low cost, it is preferred to use the ethanolamines either per se or in suitable admixtures.

It will be realized that the reaction mixture may contain either a single salt and a single amino alcohol, or admixtures of silver salts and amino alcohols which are compatible. The reflecting surfaces may be produced by means of a number of procedures, and these will be illustrated by means of the ethanolamines. Thus, triethanolamine or diethanolamine, or monoethanolamine may be added to a warm solution of silver nitrate, whereupon deposition of silver is occasioned. Otherwise, the ethanolamine may be added to a solution of silver nitrate and the mixture thus produced warmed with accompanying deposition.

Further, a solution of technical triethanolamine, i. e., a mixture of the mono-, di- and triethanolamines, may be added to a warm solution of silver nitrate and heating continued, or a solution of triethanolamine may be added to a warm solution of silver sulfate.

The foregoing procedures effect a satisfactory deposition of silver upon the surface with which the solution contacts with the formation of an even and unpitted reflecting surface.

As illustrative embodiments of a manner in which the invention is carried out in practice, the following examples are given:

Example I 10 parts of silver nitrate solution having a concentration of about .1 normal is added to about 20 parts of water. The solution thus obtained is then heated in the neighborhood of 80-90°, to which there is added about 4 parts of technical triethanolamine in solution having a strength of about .3 molar. Heating of the composition thus obtained in contact with an object to be coated results in the formation of a silvered mirror surface in about two minutes.

Example II

A silver sulfate solution of a concentration of about .02 molar and in a quantity of about 30 parts is heated to a temperature in the neighborhood of 80° C. To the heated solution there is added about 5 parts of triethanolamine, concentration .3 molar, and heating continued in contact with the material to be silvered, with resulting formation of a mirror in a period of several minutes.

Example III

To about 10 parts of a solution of silver nitrate of a concentration about .1 normal, there is added about 2 to 4 parts of pure mono-ethanolamine. The reaction mass so produced may then be warmed to a temperature of about 80° C. in contact with the object to be silvered, whereupon a mirror forms in a period of a few minutes.

In accordance with the method hereinbefore described, mirrors having a silvered surface may be produced readily and efficiently without the necessary use of a highly caustic material, as potassium hydroxide and a tartrate. Instead of utilization of a mixture of tartrate and caustic potash, there is employed a simple type of compound, namely an amino-alcohol. It will be understood that the invention is not limited to the specific materials and conditions of concentration and temperature set forth in the foregoing examples, but rather that there is encompassed within its scope the utilization of various salts of silver and also various amino alcohols. In view of the ready availability and low cost, it is preferred to form the silver surface by reaction between silver nitrate and a beta-ethanolamine, specifically triethanolamine. The method leads to the formation of a silvered surface by a series of steps which may be performed with ease, either on a small or a large scale.

The silvered reflecting surface obtained may be finished by a thorough washing and then covered in a suitable manner as by the application thereto of a colorless varnish, shellac or lacquer. Suitable materials upon which to form the mirror are glass and metals, as copper, nickel and zinc.

In the event that the mirror is produced on what may be termed the reverse side of a plate glass, the finishing may be effected by applying any desired protective coating which may be a paint.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method for the formation of a silvered reflecting surface, which comprises reacting a silver salt with a beta-ethanolamine.

2. A method for the formation of a silvered reflecting surface, which comprises reacting a silver salt with mixed beta-ethanolamines.

3. A method for the formation of a silvered reflecting surface, which comprises reacting a silver salt with triethanolamine.

4. A method for the formation of a silvered reflecting surface, which comprises reacting silver nitrate and a beta-ethanolamine in solution.

5. A method for the formation of a silvered reflecting surface, which comprises reacting silver nitrate and triethanolamine in solution.

6. A method for the formation of a silvered reflecting surface, which comprises reacting silver nitrate and triethanolamine in solution at a temperature in the neighborhood of 80° C.

7. A silvering composition comprising a silver salt and a beta-ethanolamine.

8. A silvering composition comprising silver nitrate and triethanolamine in reactive proportions.

9. A method for the formation of a reflecting surface which comprises reacting a silver salt with an amino alcohol of the group consisting of ethanol, propanol and butanol amines in which the amino and hydroxyl groups are joined to different carbon atoms.

10. A method for the formation of a silvered reflecting surface which comprises reacting silver nitrate with an amino alcohol of the group consisting of ethanol, propanol and butanol amines in which the amino and hydroxyl groups are joined to different carbon atoms.

11. A silvering composition comprising a silver salt and an amino alcohol of the group consisting of ethanol, propanol and butanol amines in which the amino and hydroxyl groups are joined to different carbon atoms.

MAX MELTSNER.